(12) United States Patent
Shih

(10) Patent No.: US 6,283,593 B1
(45) Date of Patent: Sep. 4, 2001

(54) REPLACEABLE SPRING ARM STRUCTURE FOR SPECTACLES

(76) Inventor: Ching-Chou Shih, 405 Lynrose St., Arcadia, CA (US) 91006

( * ) Notice: Subject to any disclaimer, the term of this patent is extended or adjusted under 35 U.S.C. 154(b) by 0 days.

(21) Appl. No.: 09/657,553

(22) Filed: Sep. 8, 2000

(51) Int. Cl.[7] ............................. G02B 5/22; G02B 5/14; G02B 5/16

(52) U.S. Cl. .................. 351/153; 351/113; 351/116; 16/228

(58) Field of Search ................................ 351/153, 116, 351/111, 113, 114, 140, 41, 158; 16/228

(56) References Cited

U.S. PATENT DOCUMENTS 5,953,791 * 9/1999 Da Forno .................. 16/228

* cited by examiner

Primary Examiner—Hung Xuan Dang
(74) Attorney, Agent, or Firm—Raymond Y. Chan; David and Raymond Patent Group

(57) ABSTRACT

A replaceable spring arm structure for a spectacles includes an elongated spring arm which has a front end connected to a respective side extension of the spectacles and is detachably disposed in the slider cavity provided on a front end of a temple of the spectacles in a slidably movable manner, a locking member slidably mounted on the spring arm for locking with the locking through hole of the slider cavity so as to securely hold the spring arm in the slider cavity, and a resilient element which is mounted on the spring arm for applying an urging pressure against the spring arm, so as to normally retain the spring arm at an innermost position of the slider cavity. During folding and unfolding the spectacles, the spring arm is driven to slide outwardly along the slider cavity by a pulling force applied by the respective temple, so as to compress the resilient element. After the temple is folded and unfolded, the compressed resilient element is automatically rebounded to its original form and the spring arm automatically returns to its original position. To replace the hinge portion of the side extension, a user may unlock the locking member with the locking through hole such that the spring arm is adapted to be slid apart from the slider cavity, so as to replace the worn-out parts of the spring arm structure such as the resilient element.

28 Claims, 5 Drawing Sheets

REPLACEABLE SPRING ARM STRUCTURE FOR SPECTACLES

BACKGROUND OF THE PRESENT INVENTION

1. Field of Invention

The present invention relates to spectacles, and more particularly to a replaceable spring arm structure for spectacles, which adapted for replacing the spring mounted in the temple, so as to maximize and extend the life span of the spectacles while being cost effective.

2. Description of Related Arts

Referring to FIGS. 1 and 2, conventional spectacles 1 comprise a frame body 10 for mounting a pair of lenses 101, 102 in position. The frame body 10 comprises a bridge 11 connected between the two lenses 101, 102, and two side extensions 12, 13 provided at two outer sides of the lenses 101, 102 respectively wherein each side extension 12, 13 has a hinge portion 16, 17 rearwardly extended therefrom for pivotally coupling a temple 14, 15. Each hinge portion 16, 17 of the spectacles 1 comprises a connecting arm 161, 171 having a spring 162, 172 coaxially mounted thereon. The connecting arm 161, 171 is connected between the side extension 12, 13 and the temple 14, 15. Each connecting arm 161, 171 has a rear end inserted into a chamber 141, 151 provided at a front end of the temple 14, 15 and a front end pivotally connected with the side extension 12, 13 by means of a screw 18, so as to rotatably lock up the temple 14, 15 with the side extension 12, 13.

Each spring 162, 172 is adapted for applying an urging force between the respective side extension 12, 13 and the temple 14, 15 such that when unfolding the spectacles 1, the spring 162, 172 will be forced to extend and then return to its original form after the temple 14, 15 is unfolded, so as to retain the temple 14, 15 in an unfolded position. Likewise, when folding the spectacles 1, the spring 162, 172 will also be forced to extend first and then return to its original form after the temple 14, 15 is folded. So, every time when the spectacles 1 is being unfolded and folded, the spring 162, 172 is forced to extend and compress such that after a period of the time, the elasticity of the spring 162, 172 will become weaker or even be broken. The urging force of the spring 162, 172 may not strong enough to apply between the side extension 12, 13 and the temple 14, 15 so that the temple 14, 15 will tend to loosely affix to the side extension 12, 13. The wearer may feel uncomfortable to wear such spectacles.

Since each hinge portion 16, 17 is affixed between the side extension 12, 13 and the temple 14, 15, the wearer may not able to detach or repair the worn-out parts such that the wearer may even have to waste expense to buy another new spectacle frame for substituting the used one, which is a waste of source.

SUMMARY OF THE PRESENT INVENTION

A main object of the present invention is to provide a replaceable spring arm structure for spectacles, which is adapted for replacing the worn-out spring that loses its elasticity, is broken, or rusted.

Another object of the present invention is to provide a replaceable spring arm structure for spectacles, which has a simple structural design for easy installation or repair of the spring arm.

Another object of the present invention is to provide a replaceable spring arm structure for spectacles, which is adapted to maximize and extend the life span of the spectacles while being cost effective.

Accordingly, in order to accomplish the above objects, the present invention provides a replaceable spring arm structure for spectacles which comprises a frame body for mounting a pair of lenses in position. The frame body comprises a bridge connected between the two lenses and two side extensions provided at two outer sides of the lenses respectively each having the spring arm structure rearwardly extended to pivotally and detachably couple a temple, wherein an elongated slider cavity is coaxially provided at a front end of the temple and at least a locking through hole is perpendicularly formed on the front end of the temple to communicate the slider cavity with outside.

The spring arm structure comprises an elongated spring arm which has a front end connected to the respective side extension and is detachably disposed in the slider cavity in a slidably movable manner, a locking member slidably mounted on the spring arm for locking with the locking through hole of the slider cavity so as to securely hold the spring arm in the slider cavity, and a resilient element which is mounted on the spring arm for applying an urging pressure against the spring arm, so as to normally retain the spring arm at an innermost position of the slider cavity.

During folding and unfolding the spectacles, the spring arm is driven to slide outwardly along the slider cavity by a pulling force applied by the respective temple, so as to compress the resilient element. After the temple is folded and unfolded, the compressed resilient element is automatically rebounded to its original form and the spring arm automatically returns to its original position.

To replace the hinge portion of the side extension, a user may unlock the locking member with the locking through hole such that the spring arm is adapted to be slid apart from the slider cavity, so as to replace the worn-out parts of the spring arm structure such as the resilient element.

DETAILED DESCRIPTION OF THE PREFERRED EMBODIMENT

Figure 1:
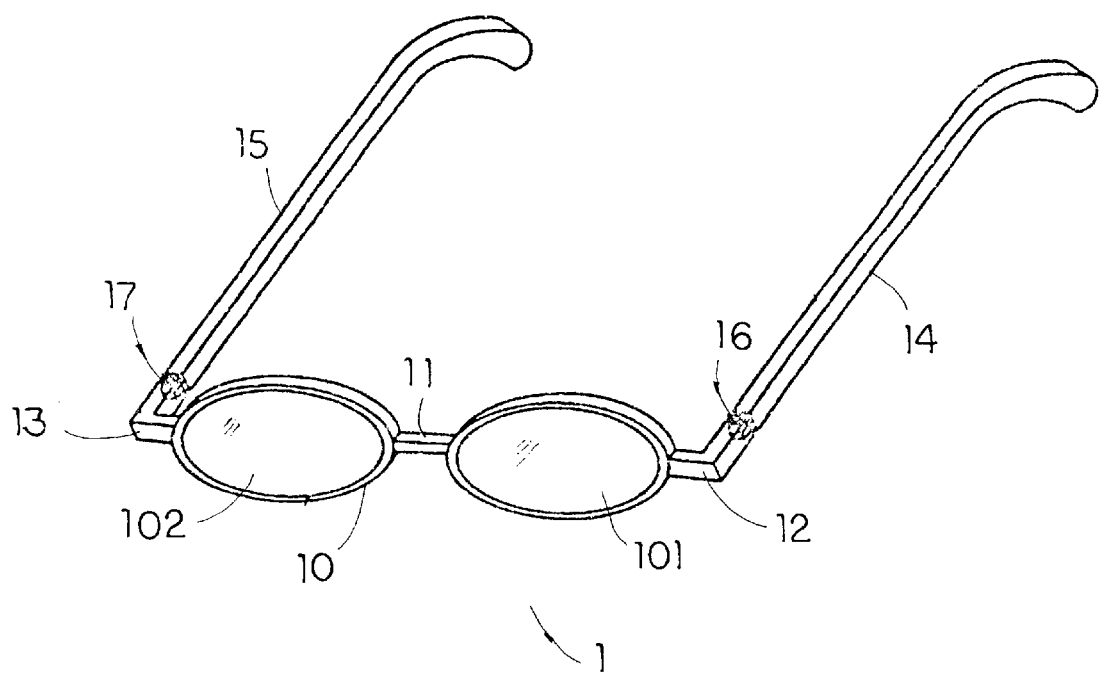
FIG. 1 is a perspective view of a conventional spectacles.
Figure 2:
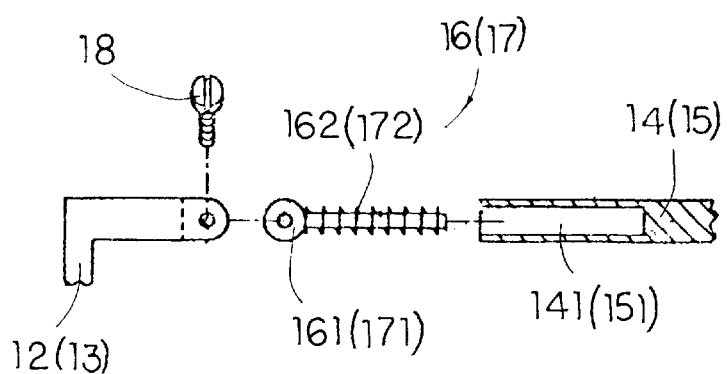
FIG. 2 is an exploded view illustrating a conventional spectacles having spring arm structure.
Figure 3:
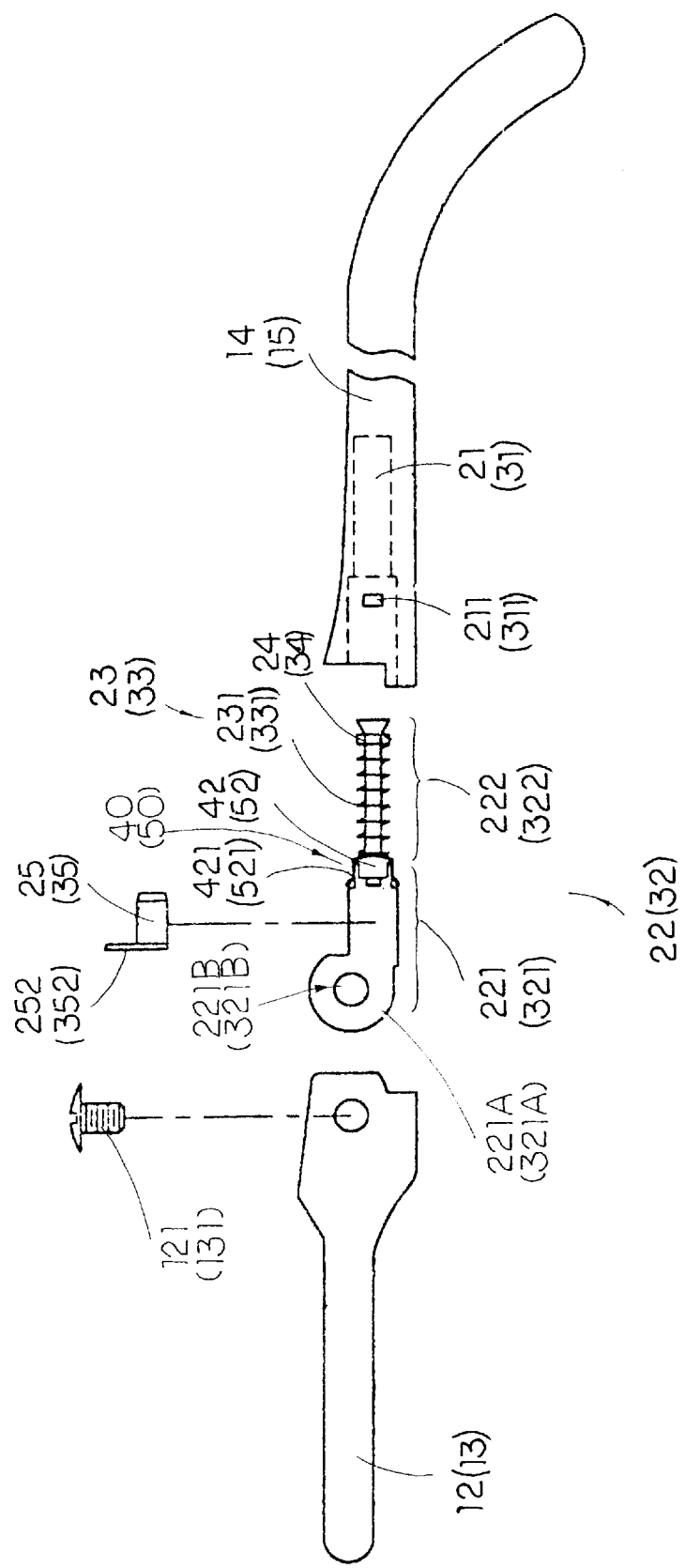
FIG. 3 is an exploded view of a replaceable spring arm structure for spectacles according to a preferred embodiment of the present invention.

Referring to FIGS. 1 and 3 of the drawings, a spectacles 1 comprises a frame body 10 for mounting a pair of lenses 101, 102 in position. The frame body 10 comprises a bridge 11 connected between the two lenses 101, 102 and two side extensions 12, 13 provided at two outer sides of the lenses 101, 102 respectively. Each of the side extensions 12, 13 connects a replaceable spring arm structure 20, 30 which comprises an elongated spring arm rearwardly extended to pivotally and detachably couples a temple 14, 15 and a resilient element 23, 33.

Practically, the frame body 10 can be constructed as a conventional spectacle frame to have a pair of rims as shown in FIG. 1 or a rimless frame that the bridge 11 and the two side extensions 12, 13 are directly fastened to the edges of the two lenses 101, 102. The major different between the frame body 10 of the present invention and the conventional spectacles is the two replaceable spring arm structures 20, 30, each of which is adapted for replacing the worn-out parts thereof.

A front end of the temple 14, 15 of each of the replaceable spring arm structure 20, 30 has an elongated slider cavity 21, 31 longitudinally extended therein. Referring to FIG. 3, each of the temple 14, 15 further has at least a locking through hole 211, 311 perpendicularly formed at the front end thereof to communicate the slider cavity 21, 31 with outside. According to the preferred embodiment, it is preferred to have two locking through holes 211, 311 oppositely formed on a top and a bottom side of the temple 14, 15 respectively.

Figure 8:
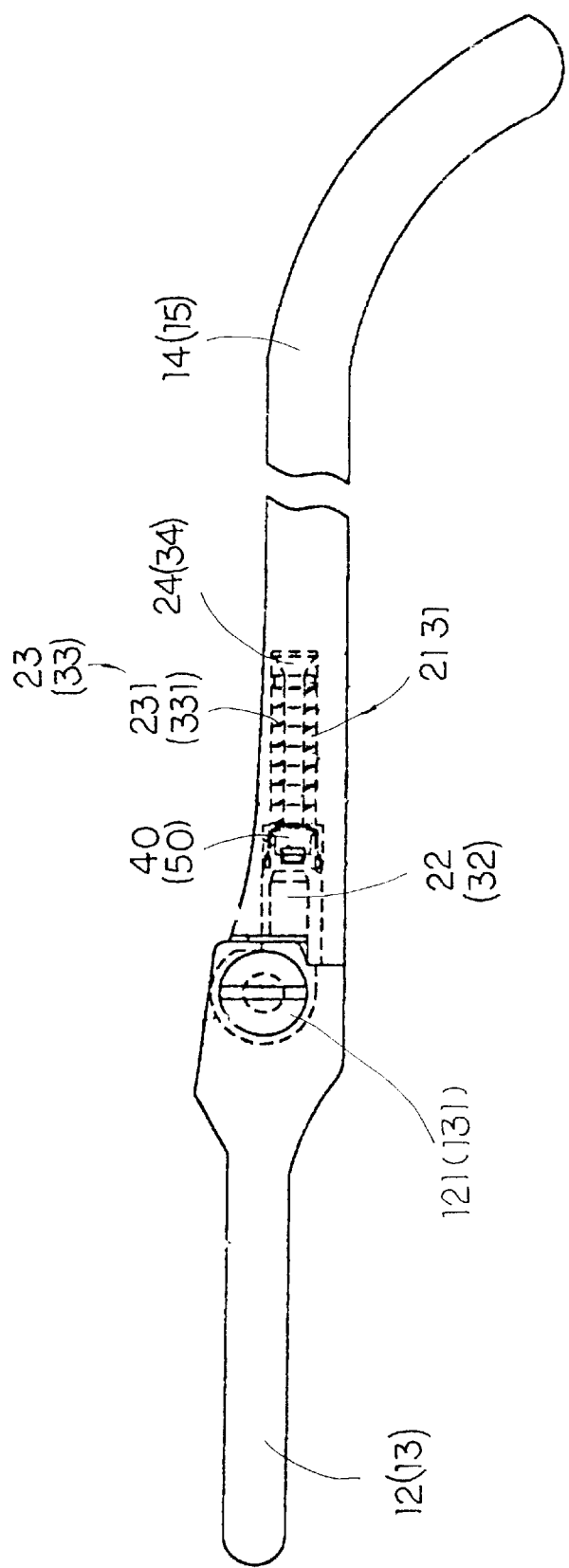
FIG. 8 is a schematic view of the replaceable spring arm structure for spectacles, after assembled, according to the above preferred embodiment of the present invention.

The spring arm 22, 32 of each of the replaceable spring arm structure 20, 30 is detachably disposed in the respective slider cavity 21, 31 in a slidably movable manner, wherein the spring arm 22, 32 further comprises a locking member 40, 50 slidably mounted thereon for locking with the locking through hole 211, 311 of the respective temple 14, 15, so as to securely hold the spring arm 22, 32 within the slider cavity 21, 31, as shown in FIG. 8. The resilient element 23, 33 is mounted the spring arm 22, 32 for applying an urging pressure against the spring arm 22, 32, so as to normally retain the spring arm 22, 32 at an innermost position of the slider cavity 21, 31.

Figure 4:
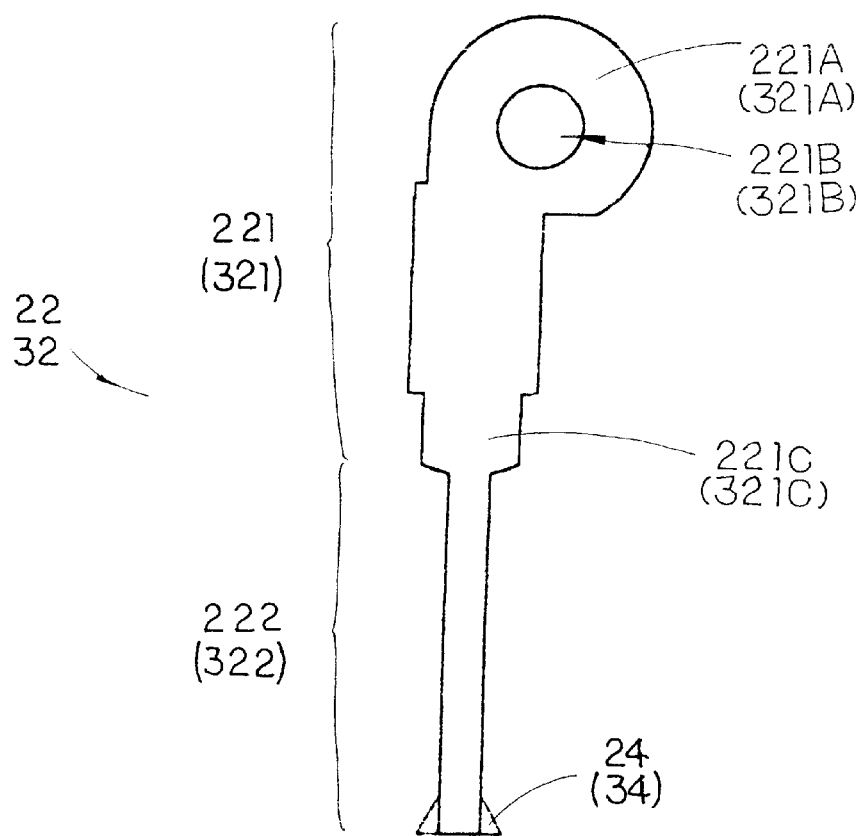
FIG. 4 is a side view of a spring arm of the replaceable spring arm structure for spectacles according to the above preferred embodiment of the present invention.

Referring to FIG. 4, the spring arm 22, 32 has a head portion 221, 321 and a tail portion 222, 322. A front end of the head portion 221, 321 is enlarged to form a pivot head 221A, 321A having a connection hole 221B, 321B provided thereon for pivotally connecting with the respective side extension 12, 13 by means of a screw 121, 131, as shown in FIGS. 3 and 8. A rear end of the head portion 221, 321 forms a retainer seat 221C, 321C for holding the respective locking member 40, 50 in position. The rod-like tail portion 222, 322 of the spring arm 22, 32, which is coaxially and rearwardly extended from the retainer seat 221C, 321C, is slidably inserted into the respective slider cavity 21, 31.

Figure 5:
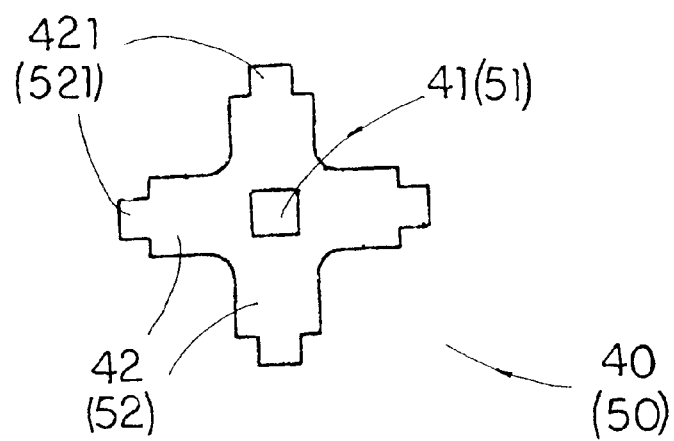
FIG. 5 is a top view of a locking member of the replaceable spring arm structure for spectacles according to the above preferred embodiment of the present invention.
Figure 6:
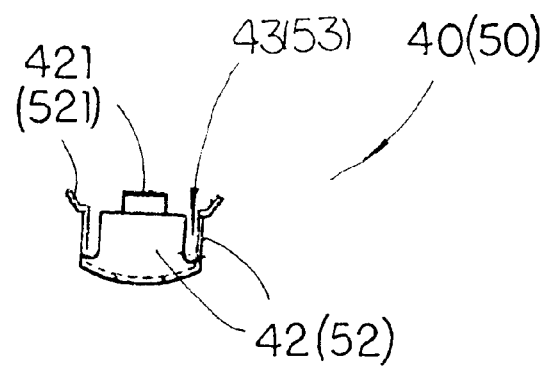
FIG. 6 is a side view of the locking member of the replaceable spring arm structure for spectacles according to the above preferred embodiment of the present invention.

As shown in FIGS. 5 and 6, each of the locking members 40, 50 is made of thin metal and cut to a structure as shown in FIG. 5, which has a central hole 41, 51 for the retainer seat 221C, 321C of the spring arm 22, 32 inserting therethrough so as to coaxially mount the locking member 40, 50 on the retainer seat 221C, 321C, and comprises a plurality of elastic locking latches 42, 52 integrally and spacedly extended upwardly to form a U-shaped cross section for the locking member 40, 50 and define a holding chamber 43, 54 between the elastic locking latches 42, 52, as shown in FIG. 6. Each of the locking latches 42, 52 has a locking tip 421, 521 bended outwardly for engaging with the respective locking through hole 211, 311.

The central hole 41, 51 has a diameter slightly larger than a diameter of the tail portion 222, 322 of the spring arm 22, 32 such that the tail portion 222, 322 of the spring arm 22, 32 is adapted for fittedly inserting through the central hole 41, 51 of the locking member 40, 50 until the retainer seat 221C, 321C is received in the holding chamber 43, 53, so as to securely mount the locking member 40, 50 on the retainer seat 221C, 321C of the spring arm 22, 32 coaxially, as shown in FIG. 3.

The resilient element 23, 33, according to the preferred embodiment, is a compression spring 231, 331 wherein the compression spring 231, 331 has a diameter slightly larger than the cross sectional size of the tail portion 222, 322 of the spring arm 22, 32 so that the compression spring 231, 331 can be mounted on the tail portion 222, 322 of the spring arm 22, 32 by passing the tail portion 22 through the resilient element 23, 33.

In order to hold the resilient element 23, 33 in position, each spring arm structure 20, 30 further comprises a blocker 24, 34 affixed on a rear end of the tail portion 222, 322 of the respective spring arm 22, 32, so that two ends of the resilient element 23, 33 are biasing against the locking member 40, 50 and the blocker 24, 34, so as to prevent a lateral movement of the resilient element 23, 33. Accordingly, the resilient element 23, 33 will normally urge and retain the spring arm 22, 32 in a normal position that the spring arm 22, 32 is in the innermost position of the slider cavity 21, 31.

Figure 7:
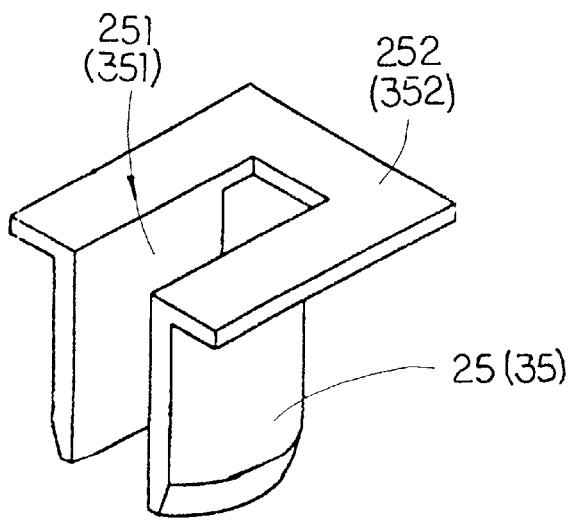
FIG. 7 is a perspective view of a guiding member of the replaceable spring arm structure for spectacles according to the above preferred embodiment of the present invention.

Each spring arm structure 20, 30 further comprises a L-shaped guiding member 25, 35 slidably mounted on the head portion 221, 321 of the spring arm 22, 32, wherein each of the guiding members 25, 35 comprises a guiding slot 251, 351 longitudinally formed thereon, and a blocking wall 252, 352 for fittedly covering the respective slider cavity 21, 31, as shown in FIG. 7. The head portion 221, 321 of the spring arm 22, 23 is slidably disposed along the guiding slot 251, 351 of the guiding member 25, 35 wherein when the spring arm 22, 32 is inserted into the slider cavity 21, 31, the blocking wall 252, 352 is covered on a front end opening of the slider cavity 21, 31.

When folding and unfolding the spectacle, the pivot movement of the two temples 14, 15 are driven to pull the spring arms 22, 32 away from the slider cavities 21, 31 respectively in such a manner that the resilient elements 22, 32 are respectively compressed by the locking members 40, 50 which are locked up in the slider cavities 21, 31 respectively. After the temples 14, 15 are folded or unfolded with respect to the side extensions 12, 13, the compressed resilient elements 22, 32 will rebound to its original form which pushes the spring arms 22, 32 back to its original position which is the innermost position of the slider cavities 251, 351 respectively.

Accordingly, when the spring arm 22, 32, the resilient element 22, 32, the locking member 40, 50, or the guiding member 25, 35 is worn out, the user may easily to replace any of the above parts of the spring arm structures 20, 30 of the present invention. The user may use a sharp tip to press in the locking tip 421, 521 so as to disengage the locking tip 421, 521 with the respective locking through hole 211, 311 so as to unlock the spring arm 22, 32 with the respective temple 14, 15. Then, the spring arm 22, 32 can be detached and slid away from the slider cavity 21, 31 for replacing the worn-out part of the spring arm structure 20, 30 as well as the temple.

The advantages of the replaceable spring arm structure for spectacles of the present invention include the following:
  1. The assembly and disassembly of the spring arm structure 20, 30 are simple and easy. Simply by disengaging the locking member 40, 50 with the respective locking through hole 211, 311, the user is able to pull the spring arm 22, 32 out of the slider cavity 21, 31 of the temple 14, 15 in order to replace the worn-out parts of the spring arm structure 20, 30 or replace a new temple. Then, simply by re-inserting the spring arm 22, 32 into the slider cavity 21, 31 until the locking member 40, 50 is engaged with the locking through hole 211, 311. It is so easy that even the user can repair the worn-out parts by himself or herself.

2. Since the worn-out parts of the spring arm structure 20, 30 are replaceable, the life span of the spectacles is extended and maximized in low cost.

3. The replaceable spring arm structure of the present invention can be applied to all kinds of spectacles. It does not require to alter the structural design of the spectacles so as to minimum the manufacturing cost of the spectacles incorporated with the replaceable spring arm structures 20, 30.

What is claimed is:

1. A spectacles, comprising:

a frame body for mounting a pair of lenses in position;

a bridge connected between said two lenses;

two side extensions provided at two outer sides of said lenses respectively each having said spring arm structure rearwardly extended; and a pair of replaceable spring arm structures, each comprising a temple pivotally and detachably coupling with said respective side extension, wherein an elongated slider cavity is coaxially provided at a front end of said temple and at least a locking through hole is perpendicularly formed on said front end of said temple to communicate said slider cavity with outside, an elongated spring arm which has a front end pivotally connected to said respective side extension and is detachably disposed in said slider cavity in a slidably movable manner, a locking member slidably mounted on said spring arm for locking with said locking through hole so as to securely hold said spring arm in said slider cavity, and a resilient element which is mounted on said spring arm for applying an urging pressure against said spring arm, so as to normally retain said spring arm at an innermost position of said slider cavity, thereby during folding or unfolding said spectacles, said spring arms are driven to slide outwardly along said slider cavities by pulling forces applied by said temples so as to compress said resilient elements respectively, so that after said temples are folded up or unfolded, said compressed resilient elements automatically rebounded to original forms thereof and said spring arms automatically return to original positions thereof respectively.

2. The spectacles as recited in claim 1 wherein said spring arm has a head portion and a tail portion, a front end of said head portion being enlarged to form a pivot head having a connection hole provided thereon for pivotally connecting with said respective side extension, wherein said tail portion of said spring arm, which is coaxially and rearwardly extended from said retainer seat, is slidably inserted into said respective slider cavity.

3. The spectacle as recited in claim 2 wherein each of said spring arm structures further comprises a blocker provided at a rear end of said tail portion of said respective spring arm, wherein two ends of each of said resilient elements are biasing against said respective locking member and said respective blocker, so as to render said resilient element normally urging and retaining said spring arm in a normal position that said spring arm is in said innermost position of said slider cavity.

4. The spectacles as recited in claim 1 wherein a rear end of each of said head portions forms a retainer seat for holding said respective locking member in position.

5. The spectacles as recited in claim 4 wherein each of said locking members has a central hole for said retainer seat of said spring arm inserting therethrough so as to coaxially mount said locking member on said retainer seat, and comprises at least an elastic locking latch integrally and spacedly extended, wherein each of said locking latches has a locking tip bended outwardly for engaging with said respective locking through hole, said central hole having a diameter slightly larger than a diameter of said tail portion of said spring arm such that said tail portion of said spring arm is adapted for fittedly inserting through said central hole of said locking member so as to securely mount said locking member on said retainer seat of said spring arm.

6. The spectacle as recited in claim 5 wherein each of said resilient elements is a compression spring which has a diameter slightly larger than said cross sectional size of said tail portion said spring arm so as to enable said compression springs mounting on said tail portions of said spring arms by passing said tail portions through said resilient elements respectively.

7. The spectacle as recited in claim 6 wherein each of said spring arm structures further comprises a blocker provided at a rear end of said tail portion of said respective spring arm, wherein two ends of each of said resilient elements are biasing against said respective locking member and said respective blocker, so as to render said resilient element normally urging and retaining said spring arm in a normal position that said spring arm is in said innermost position of said slider cavity.

8. The spectacle as recited in claim 7 wherein each of said spring arm structures further comprises a L-shaped guiding member slidably mounted on said head portion of said spring arm, wherein each of said guiding members comprises a guiding slot longitudinally formed thereon, and a blocking wall for fittedly covering said respective slider cavity, wherein said head portion of said spring arm is slidably disposed along said guiding slot of said guiding member, wherein when said spring arm is inserted into said slider cavity, said blocking wall covers a front end opening of said slider cavity.

9. The spectacle as recited in claim 6 wherein each of said spring arm structures further comprises a L-shaped guiding member slidably mounted on said head portion of said spring arm, wherein each of said guiding members comprises a guiding slot longitudinally formed thereon, and a blocking wall for fittedly covering said respective slider cavity, wherein said head portion of said spring arm is slidably disposed along said guiding slot of said guiding member, wherein when said spring arm is inserted into said slider cavity, said blocking wall covers a front end opening of said slider cavity.

10. The spectacle as recited in claim 5 wherein each of said spring arm structures further comprises a blocker provided at a rear end of said tail portion of said respective spring arm, wherein two ends of each of said resilient elements are biasing against said respective locking member and said respective blocker, so as to render said resilient element normally urging and retaining said spring arm in a normal position that said spring arm is in said innermost position of said slider cavity.

11. The spectacles as recited in claim 4 wherein each of said temples further comprises an additional locking through hole that said two locking through holes are provided on two opposite sides of the said front end of said respective temple, wherein each of said locking members has a central hole for said retainer seat of said spring arm inserting therethrough so as to coaxially mount said locking member on said retainer seat, and comprises at least two elastic locking latches integrally and spacedly extended upwardly to form a U-shaped cross section for said locking member 40, 50 and define a holding chamber 43, 54 between said elastic locking latches 42, 52, wherein two ends of the two locking latches are bended outwardly to form two locking tips for engaging with said two locking through holes respectively, said central hole having a diameter slightly larger than a diameter of said tail portion of said spring arm such that said tail portion of said spring arm is adapted for fittedly inserting through said central hole of said locking member until said retainer seat is received in said holding chamber, so as to securely mount said locking member on said retainer seat of said spring arm.

12. The spectacle as recited in claim 11 wherein each of said resilient elements is a compression spring which has a diameter slightly larger than said cross sectional size of said tail portion said spring arm so as to enable said compression springs mounting on said tail portions of said spring arms by passing said tail portions through said resilient elements respectively.

13. The spectacle as recited in claim 12 wherein each of said spring arm structures further comprises a blocker provided at a rear end of said tail portion of said respective spring arm, wherein two ends of each of said resilient elements are biasing against said respective locking member and said respective blocker, so as to render said resilient element normally urging and retaining said spring arm in a normal position that said spring arm is in said innermost position of said slider cavity.

14. The spectacle as recited in claim 13 wherein each of said spring arm structures further comprises a L-shaped guiding member slidably mounted on said head portion of said spring arm, wherein each of said guiding members comprises a guiding slot longitudinally formed thereon, and a blocking wall for fittedly covering said respective slider cavity, wherein said head portion of said spring arm is slidably disposed along said guiding slot of said guiding member, wherein when said spring arm is inserted into said slider cavity, said blocking wall covers a front end opening of said slider cavity.

15. The spectacle as recited in claim 12 wherein each of said spring arm structures further comprises a L-shaped guiding member slidably mounted on said head portion of said spring arm, wherein each of said guiding members comprises a guiding slot longitudinally formed thereon, and a blocking wall for fittedly covering said respective slider cavity, wherein said head portion of said spring arm is slidably disposed along said guiding slot of said guiding member, wherein when said spring arm is inserted into said slider cavity, said blocking wall covers a front end opening of said slider cavity.

16. The spectacle as recited in claim 11 wherein each of said spring arm structures further comprises a blocker provided at a rear end of said tail portion of said respective spring arm, wherein two ends of each of said resilient elements are biasing against said respective locking member and said respective blocker, so as to render said resilient element normally urging and retaining said spring arm in a normal position that said spring arm is in said innermost position of said slider cavity.

17. The spectacle as recited in claim 4 wherein each of said spring arm structures further comprises a blocker provided at a rear end of said tail portion of said respective spring arm, wherein two ends of each of said resilient elements are biasing against said respective locking member and said respective blocker, so as to render said resilient element normally urging and retaining said spring arm in a normal position that said spring arm is in said innermost position of said slider cavity.

18. The spectacle as recited in claim 1 wherein each of said spring arm structures further comprises a blocker provided at a rear end of said tail portion of said respective spring arm, wherein two ends of each of said resilient elements are biasing against said respective locking member and said respective blocker, so as to render said resilient element normally urging and retaining said spring arm in a normal position that said spring arm is in said innermost position of said slider cavity.

19. The spectacle as recited in claim 18 wherein each of said spring arm structures further comprises a L-shaped guiding member slidably mounted on said head portion of said spring arm, wherein each of said guiding members comprises a guiding slot longitudinally formed thereon, and a blocking wall for fittedly covering said respective slider cavity, wherein said head portion of said spring arm is slidably disposed along said guiding slot of said guiding member, wherein when said spring arm is inserted into said slider cavity, said blocking wall covers a front end opening of said slider cavity.

20. The spectacle as recited in claim 1 wherein each of said spring arm structures further comprises a L-shaped guiding member slidably mounted on said head portion of said spring arm, wherein each of said guiding members comprises a guiding slot longitudinally formed thereon, and a blocking wall for fittedly covering said respective slider cavity, wherein said head portion of said spring arm is slidably disposed along said guiding slot of said guiding member, wherein when said spring arm is inserted into said slider cavity, said blocking wall covers a front end opening of said slider cavity.

21. A replaceable spring arm structure for spectacles, comprising:

an elongated spring arm for detachably disposing in a slider cavity provided at a front end of a temple of a spectacles in a slidably movable manner, said spring arm having a front end for pivotally connecting to a side extension of said spectacles, a locking member slidably mounted on said spring arm for locking with at least a locking through hole perpendicularly provided on said front end of said temple so as to securely hold said spring arm in said slider cavity of said temple, and a resilient element which is mounted on said spring arm for applying an urging pressure against said spring arm, for normally retaining said spring arm at an innermost position of said slider cavity.

22. The spectacles as recited in claim 21 wherein said spring arm has a head portion and a tail portion, a front end of said head portion being enlarged to form a pivot head having a connection hole provided thereon for pivotally connecting with said side extension, wherein said tail portion of said spring arm is coaxially and rearwardly extended to slidably insert into said respective slider cavity.

23. The spectacles as recited in claim 22 wherein a rear end of each of said head portions forms a retainer seat for holding said respective locking member in position and said tail portion is rearwardly extended from said retainer seat.

24. The spectacles as recited in claim 23 wherein said locking member has a central hole for said retainer seat of said spring arm inserting therethrough so as to coaxially mount said locking member on said retainer seat, and comprises at least an elastic locking latch integrally and spacedly extended, wherein said locking latch has a locking tip bended outwardly for engaging with said locking through hole, said central hole having a diameter slightly larger than a diameter of said tail portion of said spring arm such that said tail portion of said spring arm is adapted for fittedly inserting through said central hole of said locking member so as to securely mount said locking member on said retainer seat of said spring arm.

25. The spectacle as recited in claim 24 wherein said resilient element is a compression spring which has a diameter slightly larger than said cross sectional size of said tail portion said spring arm for mounting said compression spring on said tail portion of said spring arm by passing said tail portion through said resilient element.

26. The spectacle as recited in claim 25 further comprising a blocker provided at a rear end of said tail portion of said spring arm, wherein two ends of each of said resilient elements are biasing against said locking member and said blocker.

27. The spectacle as recited in claim 26 further comprising a L-shaped guiding member slidably mounted on said head portion of said spring arm, wherein said guiding member comprises a guiding slot longitudinally formed thereon, and a blocking wall for fittedly covering said slider cavity, wherein said head portion of said spring arm is slidably disposed along said guiding slot of said guiding member, wherein when said spring arm is inserted into said slider cavity, said blocking wall covers a front end opening of said slider cavity.

28. The spectacle as recited in claim 22 further comprising a L-shaped guiding member slidably mounted on said head portion of said spring arm, wherein said guiding member comprises a guiding slot longitudinally formed thereon, and a blocking wall for fittedly covering said slider cavity, wherein said head portion of said spring arm is slidably disposed along said guiding slot of said guiding member, wherein when said spring arm is inserted into said slider cavity, said blocking wall covers a front end opening of said slider cavity.

* * * * *